United States Patent [19]

Olsen et al.

[11] 4,097,719

[45] Jun. 27, 1978

[54] CONTROL SYSTEM FOR CHARGING AND DISCHARGING AN ELECTRIC STORAGE HEATER

[75] Inventors: Gunnar Ernst Rudolf Olsen; Poul Christian Carlos Iversen, both of Nordborg; Bertel Birker, Sonderborg, all of Denmark

[73] Assignee: Danfoss A/S, Nordborg, Denmark

[21] Appl. No.: 717,253

[22] Filed: Aug. 24, 1976

[30] Foreign Application Priority Data

Sep. 3, 1975 Germany ............................ 2539065

[51] Int. Cl.[2] ......................... H05B 1/02; F24H 7/04; F24D 11/00

[52] U.S. Cl. .................................... 219/364; 126/400; 165/18; 219/378; 219/491; 219/493; 219/497

[58] Field of Search ............... 219/378, 364, 365, 341, 219/325, 326, 327, 530, 540, 497, 493, 492, 491, 302; 165/18, 104, 105; 126/400

[56] References Cited

U.S. PATENT DOCUMENTS

| | | | |
|---|---|---|---|
| 3,958,101 | 5/1976 | Barabas | 219/364 |
| 3,975,620 | 8/1976 | Hallgreen et al. | 219/378 X |

*Primary Examiner*—A. Bartis

[57] ABSTRACT

An electric storage heater assembly which includes a core and a resistance heater for the core. A charging switch is in series with the resistance heater and an electric comparator for operating the switch has two inputs connected to first and second controls which are responsive to the instantaneous temperature of the core and the final temperature of the core for the preceding charging period. The first comparator input is also connected to auxiliary controls which sense indoor and outdoor temperatures and provide signals which are summed with the signal which represents the core temperature.

7 Claims, 1 Drawing Figure

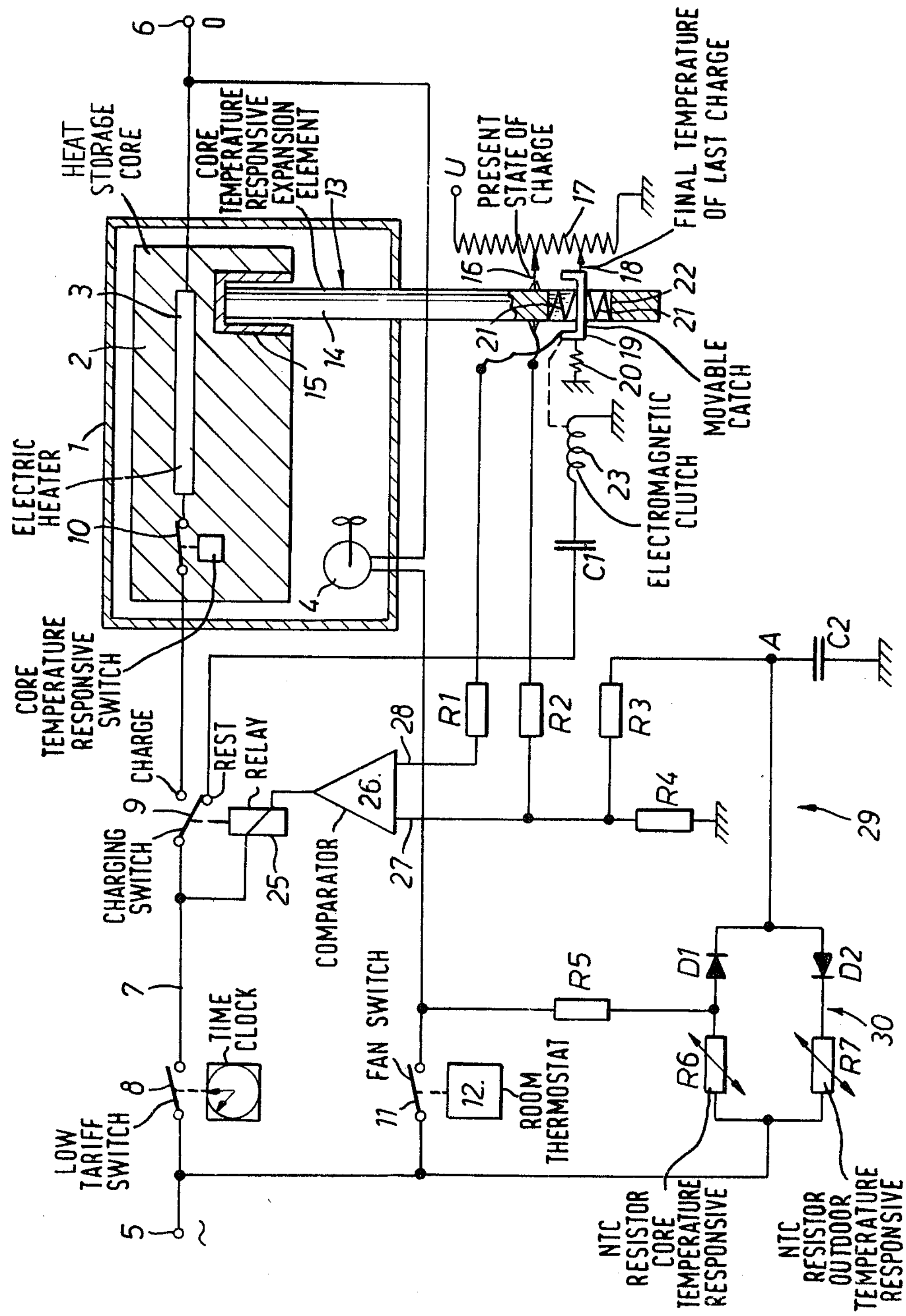
HEAT STORAGE CORE
CORE TEMPERATURE RESPONSIVE EXPANSION ELEMENT
U
PRESENT STATE OF CHARGE
FINAL TEMPERATURE OF LAST CHARGE
ELECTRIC HEATER
MOVABLE CATCH
ELECTROMAGNETIC CLUTCH
C1
CORE TEMPERATURE RESPONSIVE SWITCH
CHARGE
REST
RELAY
CHARGING SWITCH
COMPARATOR
R1
R2
R3
R4
A
C2
TIME CLOCK
LOW TARIFF SWITCH
FAN SWITCH
ROOM THERMOSTAT
R5
D1
D2
R6
R7
NTC RESISTOR CORE TEMPERATURE RESPONSIVE
NTC RESISTOR OUTDOOR TEMPERATURE RESPONSIVE

CONTROL SYSTEM FOR CHARGING AND DISCHARGING AN ELECTRIC STORAGE HEATER

The invention relates to a charging device for an electric storage heater comprising a switching device which is influenced by the charged condition of the storer, particularly its core temperature, and actuates a charging switch.

In such storage heaters, it is known to determine the residual heat of the storage core by means of a core temperature senser and the expected heat consumption and then to determine the charging period from both quantities. This leads to inaccurate results.

It is also known to formulate the daily heat consumption of the room to be heated as a current, to integrate this current and again to resolve by means of a constant monitoring current the integrated value achieved on commencement of the low-tarrif period, it being possible to use the monitoring period for determining the charging period.

The invention is based on the object of providing a charging device of the aforementioned kind which permits the charging to be very accurately adapted to the heat consumption with simple means.

This object is achieved according to the invention by a comparator which forms a control signal for actuating the switching device by comparing a first signal corresponding to the preceding maximum charge condition and a second signal corresponding to the instantaneous charge condition, and by a correcting device with which the control signal is modified by a correcting signal governed by at least one parameter that influences the discharge.

With this charging device, the particular final charging value is determined by starting with the charging value during the preceding charging period and, if necessary, modifying this by means of further parameters. If no changes occur in the outside temperature, the room temperature and the like, only that heat is replaced which was withdrawn during the discharge period. This is achieved when the instantaneous charged condition represented by the second signal has reached the maximum charged condition of the preceding charging period as represented by the first signal. Such a comparison is very simple to conduct. Even if the parameters decisive for the discharge have changed, charging as described according to the heat consumption during the preceding discharge period gives a rough picture of the withdrawal of heat to be expected during the coming discharge period. Comparatively small corrections are therefore generally sufficient to determine a new maximum charged condition which, in turn, then serves as a reference quantity for the following charge. Since the corrections are material only to the final charging value at the end of the charging period, actual parameters that influence the discharge and occur during charging can also be taken into consideration, for example the outside temperature. A preferred embodiment is characterized by a first measuring device measuring the core temperature at the end of charging and a measurement storer which stores this measurement result for delivering the first signal and by a second measuring device which measures the core temperature continuously for delivering the second signal. In this way the core temperature is used in a very simple manner to represent the charging condition and the first signal is stored.

A particularly simple construction is obtained if an expansion element influenced by the core temperature is provided as the second measuring device and a lockable catch that can be coupled thereto at the end of charging is provided as the first measuring device and the measurement storer. A single expansion element then serves for both measurements.

Further, the expansion element and the catch can each carry a potentiometer tapping and can each be connected to an input of the comparator. In this way the temperature measurements are converted to voltages that can be directly compared with one another.

In a preferred embodiment, the switching device is a relay connected to the mains between a low-tariff switch and the charging switch and the charging switch is a reversing switch which, in its rest position, applies a magnetic coupling for the catch to the mains by way of a condenser. By reason of the condenser, the reversing switch, when it returns to its rest position at the end of the charging period, delivers a current pulse to the magnetic coupling by means of which the catch is displaced to the position corresponding to the core temperature at this instant.

It is further favourable if the comparator actuates the switching device when the two measurement results exhibit a predetermined difference and if the connecting device determines this difference.

With particular advantage, provision is made for the comparator to be an electric comparator and at least one input to be energised by way of a summating circuit which is energised on the one hand by the first or second signal and on the other hand by a correcting signal delivered by the correcting device. In the summating circuit, the correcting signal is subtracted from or added to one of the core temperature measuring results. Consequently the comparator will respond only when there is a difference between the two measuring results. This difference can be changed by the correcting signal.

The correcting signal can for example be formed by the voltage at an electric storer, e.g. a condenser, which is chargeable by way of a parameter circuit and dischargeable by way of resistances.

The parameter circuit can comprise a two-position thermostatic switch which is governed by the room temperature and which is in series with a fixed resistance. It may also comprise a resistance governed by the core temperature. A resistance governed by the outside temperature is also useable.

With an alternating current supply for the parameter circuit, the thermostatic switch and the resistance governed by the core temperature may be in series with a diode and the resistance governed by the outside temperature may be in series with an oppositely poled diode. In this way a voltage is obtained at the condenser that is built up with the aid of the thermostatic switch and the resistance governed by the core temperature and that is reduced by the resistance governed by the outside temperature. When using NTC resistances, the voltage at the condenser is larger, the longer the thermostatic switch is switched on, the higher is the core temperature and the lower is the outside temperature.

In the drawing is shown an electric storage heater assembly embodying the invention.

The invention will now be described in more detail with reference to the embodiment shown in the drawing.

A storage heater 1 comprises a storage core 2 which is supplied with heat by a heating resistance 3 and which discharges uncontrolled heat by convection and radiation and controlled heat with the aid of a fan 4. The current supply is by way of an alternating current mains of which the phase conductor is connected to the terminal 5 and the zero conductor to the terminal 6. In the supply line 7 to the heating resistance 3 there is a low-tariff switch 8 which is closed by a clock only during the low-tariff periods, a charging switch 9 in the form of a reversing switch and a switch 10 which opens on excessive temperature in the core 2. The fan 4 is switched by means of a thermostatic switch 11 of which the senser 12 is subjected to the room temperature.

The storage core 2 contains an expansion element 13 having a rod 14 which is secured to a tube 15 inserted in the core 2. It carries a tapping 16 which slides on a potentiometer 17 which is supplied with a fixed voltage U. A further tapping 18 is provided on a catch 19 which is securely pressed against the potentiometer 17 by a spring 20. The catch is held between two springs 21 in a recess 22 of the rod 14. It is associated with an electromagnetic clutch 23 on the energisation of which the force of the spring 20 is overcome and the catch moves to a central position with respect to the recess 22 as determined by the springs 21. The clutch 23 is connected by way of a condenser 24 to the rest contact of the reversing switch 9. At the end of the charging period, when the reversing switch moves to the illustrated rest position, the clutch 23 receives a current pulse which operates it for a short period.

The reversing switch 9 is actuated by a relay 25 connected at the output of a comparator 26. The two inputs 27 and 28 of the comparator 26 are fed by way of a respective resistance R2 and R1 with first and second signals in the form of the voltages which were sensed at the potentiometer 17 by the tappings 18 and 16, respectively. The output current of the comparator 26 forms a control signal for the switching relay 25. With the circuit as described thus far, the comparator 26 would respond when the tappings 16 and 18 are located at the same height, i.e. when the core temperature has reached the same value as at the end of the last charging period.

A correcting device 29 is provided in order more closely to adapt the final value of the core temperature to the consumption. For this purpose, there is a condenser C2 of which the voltage at the point A acts on the input 27 of the comparator by way of resistances R3 and R4 which form a summating circuit together with the resistance R2. The condenser C2 is always charged by way of a resistance R5 and a diode D1 when the thermostatic switch 11 is closed. The longer the switched-on period, the greater will be the demand for heat and the higher will be the charging at the point A. A temperature-governed resistance R6 subjected to the core temperature similarly takes into account the amount of uncontrolled heat that is constantly discharged by radiation and convection. The condenser C2 is discharged on the one hand by way of the resistances R3 and R4 and on the other hand by way of a diode D2 and a temperature-governed resistance R7 subjected to the outside temperature. Desirably, the resistances R6 and R7 are NTC resistances. The voltage at the point A is all the higher, the longer the thermostatic switch 11 is closed, the higher is the core temperature and the lower is the outside temperature.

The charging device operates in the following manner. The catch 19 has stored the final temperature during the last charging. By controlled heat discharge with the aid of the fan 4 and uncontrolled heat discharge as a result of radiation and convection, the storage core 2 delivers heat. The core temperature therefore drops. The tapping 16 of the rod 14 therefore moves upwardly. When on commencement of the next low-tariff period the switch 8 is switched on, the relay 25 is immediatey attracted and applies the charging switch 9 to the operating position because the input signal at the input 28 of the comparator 26 originating from the tapping 18 of the catch 19 is different from the signal at the input 27 from tapping 16. The two input values approach one another when the core temperature rises again as a result of heating the core 2. The precise final value at which the relay 25 drops off again is achieved when the difference between the voltages at the tappings 16 and 18 has a value that is predetermined by the voltage at the point A. This voltage is corrected during charging by various external influences, namely the current heat discharge and the outside temperature. When the charging switch 9 returns to the rest position, the clutch 23 is momentarily energised. The pressure by the spring 20 is therefore released and the catch 19 can be displaced to the central position corresponding to the current final value of the core temperature. It is then again locked in this position by the spring 20 in order to store the temperature measurement for the next charging.

It is also possible to construct the measuring device for the charge condition and the measured value storer solely with electrical components. The correcting influence can also be exerted in different ways, for example by acting on the comparator itself.

We claim:

1. An electric storage heater assembly comprising, a heat storage core, a resistance heater for heating said core, a charging switch in series with said heater, a comparator for operating said switch having first and second inputs, a temperature responsive control element movably responsive to the temperature of said core, first control means operated by said control element for sensing the instantaneous temperature of said core during the charging period and being connected to said first input to impart a corresponding signal thereto, second control means movable at the end of the charging period by carrying means associated with said control element to an adjusted position which corresponds to the final temperature of said core for the charging period, said second control means being connected to said second input to impart a corresponding signal thereto, setting means for selectively holding said second control means in said adjusted position during the charging period and means for releasing said setting means after the end of the charging period to allow said carrying means to move said second control means to said adjusted position.

2. An electric storage heater assembly according to claim 1 including auxiliary control means responsive to at least one environmental temperature parameter and connected to said first input to impart a corresponding signal thereto which is summed with said signal of said first control means during the charging period.

3. An electric storage heater assembly according to claim 2 wherein said auxiliary control means includes a thermostat controllable by room temperature.

4. An electric storage heater assembly according to claim 3 wherein said auxiliary control means includes temperature sensitive resistances for sensing core temperatures and outdoor temperatures.

5. An electric storage heater assembly according to claim 1 wherein said first and second control means include a potentiometer and tappings therefor.

6. An electric storage heater assembly according to claim 1 including two pole relay means between said charging switch and said comparator for alternately operating said switch and said relasing means.

7. An electric storage heater assembly according to claim 6 wherein said setting means includes a locking catch and said means for releasing said setting means includes a magnetic coupling for operating the catch release said setting means.

* * * * *